United States Patent [19]

Ware

[11] 4,213,234
[45] Jul. 22, 1980

[54] METHOD AND APPARATUS FOR MANUFACTURING VEHICLE WHEEL RIMS FROM SPIRALLY WOUND SHEET METAL

[75] Inventor: Peter G. Ware, Rugby, England

[73] Assignee: Dunlop Limited, London, England

[21] Appl. No.: 785,960

[22] Filed: Apr. 8, 1977

[30] Foreign Application Priority Data

Apr. 20, 1976 [GB] United Kingdom ............... 15864/76
Jun. 12, 1976 [GB] United Kingdom ............... 24465/76
Aug. 11, 1976 [GB] United Kingdom ............... 33338/76

[51] Int. Cl.² ..................... B21H 1/02; B65H 81/00
[52] U.S. Cl. ..................................... 29/159.1; 301/97; 156/189; 156/191; 156/212; 156/446; 113/116 D
[58] Field of Search ............ 29/159.1, 159.01, 159 R, 29/512; 156/184, 187, 188, 189, 191, 212, 443, 446, 457; 113/116 D; 301/95, 96, 97, 98, 35 R, 15

[56] References Cited

U.S. PATENT DOCUMENTS

| | | | |
|---|---|---|---|
| 496,971 | 5/1893 | Fairbanks et al. | 301/98 |
| 522,047 | 6/1894 | Cowdrey | 301/98 |
| 966,873 | 8/1910 | Towne | 156/188 |
| 1,409,213 | 3/1922 | Einfeldt . | |
| 1,533,609 | 4/1925 | Pfeiffer | 156/189 |
| 1,634,145 | 6/1927 | Hathaway | 156/189 |
| 1,645,239 | 10/1927 | Hume . | |
| 1,688,762 | 10/1928 | Steenstrup . | |
| 2,096,692 | 10/1937 | Cilley | 156/184 |
| 2,099,410 | 11/1937 | Ryerson | 301/97 |
| 2,168,231 | 8/1939 | McLain et al. | 29/512 |
| 2,400,973 | 5/1946 | Bennett et al. | 29/159.1 |
| 2,469,808 | 5/1949 | Aske | 156/187 |
| 2,982,457 | 5/1961 | D'Alelio . | |
| 3,145,457 | 8/1964 | Lemmerz | 29/159.01 |
| 3,166,319 | 1/1965 | Brilhart | 156/189 |
| 3,222,769 | 12/1965 | Le Plae | 29/413 |
| 3,295,279 | 1/1967 | Wilkins . | |
| 3,345,233 | 10/1967 | Wilkins . | |
| 3,369,843 | 2/1968 | Prew | 156/189 |
| 3,509,614 | 5/1970 | Eldred . | |
| 3,645,820 | 2/1972 | Clary et al. | 156/187 |
| 3,683,479 | 8/1972 | Lejeune | 29/159.01 |
| 3,905,090 | 9/1975 | Painter | 29/455 |
| 3,917,352 | 11/1975 | Gageby | 301/63 PW |

FOREIGN PATENT DOCUMENTS

| | | | |
|---|---|---|---|
| 1777109 | 8/1971 | Fed. Rep. of Germany | 29/159.01 |
| 1422747 | 1/1976 | Fed. Rep. of Germany | 29/159.1 |
| 102761 | 12/1916 | United Kingdom | 29/159.1 |
| 399304 | 10/1933 | United Kingdom | 113/116 QA |
| 649149 | 1/1951 | United Kingdom | 156/189 |
| 862979 | 3/1961 | United Kingdom | 29/455 |
| 923648 | 4/1963 | United Kingdom | 29/159.1 |
| 1310737 | 3/1973 | United Kingdom | 29/624 |
| 1316012 | 5/1973 | United Kingdom | 156/143 |

OTHER PUBLICATIONS

Elam, D. W., "Metal to Metal Bonding With Epoxy Resin-Based Adhesives," from *Product Engineering*, Jul. 1954, pp. 166–169.

*Primary Examiner*—Daniel C. Crane
*Attorney, Agent, or Firm*—Stevens, Davis, Miller & Mosher

[57] ABSTRACT

A profiled vehicle wheel rim is manufactured by spirally winding a continuous strip of ductile sheet metal onto a profiled former, with an adhesive interposed between the turns, under forces which deform the strip from the flat state to adopt the shape of the former. In a preferred construction a disc for the wheel is interposed between two axially separable parts of the former so that the windings bend down over the axial extremities of the periphery of the disc, thus entrapping it in an annular channel of the formed rim.

25 Claims, 11 Drawing Figures

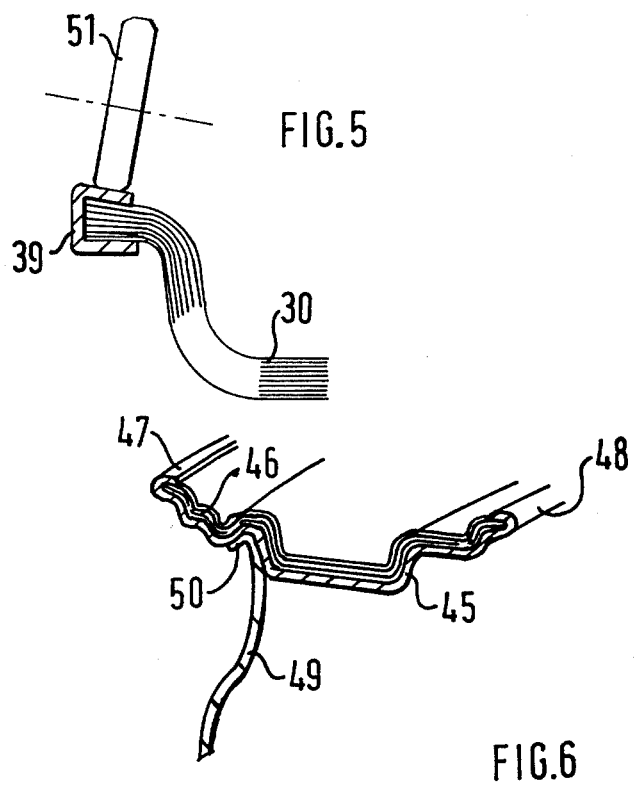
FIG. 5
FIG. 6
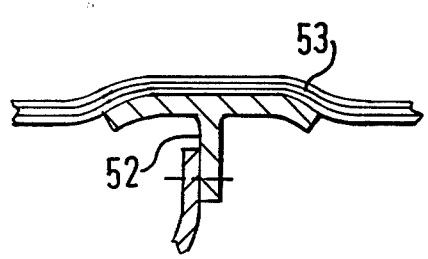
FIG. 7

METHOD AND APPARATUS FOR MANUFACTURING VEHICLE WHEEL RIMS FROM SPIRALLY WOUND SHEET METAL

The present invention relates to an improved method of manufacturing a wheel rim or wheel, to apparatus for carrying out the method and to a rim or wheel manufactured by the method or by means of the apparatus.

Among the objects of the invention are to provide an improved, light-weight wheel rim by means of plant which is relatively cheap to install and operate.

According to the present invention there is provided a method of manufacturing a profiled wheel rim comprising winding superimposed turns of an elongated strip of sheet metal with an adhesive interposed between the turns.

The expression "profiled" is intended to indicate that a specific shape is imparted to the rim in an operation not subsequent to the winding of the strip to adapt the rim for its purpose of mounting a tire so that displacement of the tire off the rim will not readily occur. This profiling of the rim distinguishes it from annular articles of cylindrical form which have hitherto been made by metal strip winding techniques, such as tubes or pipes.

In the prior art two techniques are known for manufacturing tubes or pipes by winding flat metal strip onto a mandrel. In one of these the strip is wound helically onto a mandrel so that successive turns are in edge-to-edge contact and the abutting edges are fixed together, e.g. by welding or brazing, to form the pipe. In the other the metal strip is helically wound with overlapping turns and the overlapping portions of successive turns are secured together by an adhesive.

It has also been proposed to produce annular articles not of perfectly cylindrical configuration by winding onto a mandrel strands or filamentary material such as glass fiber. To produce irregularities such as corrugations it is a simple matter to halt or reverse the travel of the wound-on material axially along the mandrel but when using sheet metal strip this is not feasible because to do so would produce bending or kinking of the strip.

In accordance with the present invention the ductile properties of metal strip are utilized to permit the strip to deform around irregularities of the contour of the former used as a mandrel so that an article not of perfectly cylindrical form can be produced without kinking or bending the strip.

In preferred embodiments of the invention the strip is wound onto the former not helically but spirally, and by the latter it is meant that there is substantially no axial offset along the former between successive turns although the possibility is not precluded that the width of the strip being wound onto the former may vary so that one turn extends laterally beyond another. An example of a way in which this feature may be utilized is that the first turn may be wider than subsequent turns and in an operation subsequent to the winding the lateral edges of the radially innermost turn of the wound rim may be bent over the superimposed turns whereby protecting them from delamination or the ingress of impurities between the windings.

Alternatively the axial end edges of the wound rim may be protected by separately formed rings which are deformed to channel-shape to enclose the end edges of the wound rim. In either case the channel enclosing each axial end edge of the wound rim may be deformed to grip the windings at a position axially inward of the end edge and this will have the effect of splaying the windings within the channel so that it is firmly locked onto the windings. It will be appreciated that adhesive is present not only between the splayed windings but throughout the interior of the channel.

The profile of a conventional wheel rim requires it to have at least the feature of radially outwardly extending flanges at its axial ends to prevent axial displacement of the tire off the rim. In the case of a rim for mounting a pneumatic tire which has bead formations at the radially inner peripheries of its sidewalls the rim is provided with bead seats on the axially inner side of these bead retention flanges. A one-piece wheel rim for mounting a pneumatic tire which has radially inextensible bead formations must also have a depressed well between the bead seats into which one of the beads may be moved to permit mounting or dismounting of the tire.

In preferred embodiments of the invention a ductile metal strip is spirally wound onto a former while subjected to forces such that the metal will deform around the shoulders or corners between the bead retention flanges and the bead seats and between the latter and the bottom of the well. To avoid an undesirable thinning of the material in particular in the region of the well the originally flat strip is preferably given a channel-shape or a shallow V cross-section prior to application to the former. This permits that there is substantially no stretching and consequently thinning of the metal in the well and such stretching and thinning as does occur is localized at the shoulders or corners and is tolerable bearing in mind the composite nature of the finished product.

One of the problems in the manufacture of vehicle wheels according to conventional techniques is in ensuring adequate securement of the disc portion of the wheel to the rim. An advantage of wheel manufacture in accordance with the present invention is that the disc of the wheel, or at least a radially inwardly extending ring onto which a disc can be secured as by bolting, can be incorporated into the rim during the winding procedure in such a way as firmly to resist axial displacement of the disc or ring out of the rim. This can be achieved by deforming down the turns of the rim on opposite sides of the incorporated disc or ring so that the latter is entrapped within an annular channel in the rim.

The shape of a wheel rim as above described lends itself to the use as a mandrel for the winding procedure of a former which is in two or more parts which can be axially separated for removal from within the wound rim. This is because the rim comprises portions which progressively reduce in diameter to the bottom of the well. When using a two-part former a flange projecting axially from the disc or disc mounting ring can conveniently overlie one of the former parts, the disc or ring being located between the two former parts during the winding procedure, and in this way the flange may constitute a radial projection from the former over which the turns are bent down to entrap the flange within the finished rim.

However application of the method of the invention is not limited to the production of rims which progressively reduce in diameter toward the base of the well and is not limited to the production of wheels with a single disc or disc fixing ring. If it is desired to produce a wheel with axially spaced-apart discs, disc mounting rings or radially inward projections of the rim itself a collapsible former or central former portion may be used. Collapsible formers are well known per se in pneumatic tire manufacturing technology and provide a generally cylindrical surface which can be reduced to permit removal of the former from the wound rim or wheel.

Preferred embodiments of the present invention will now be described with reference to the accompanying diagrammatic drawings, in which:

FIG. 5 illustrates a means of crimping a channel onto a rim end edge, and

FIGS. 6 to 11 illustrate alternative wheels constructed in accordance with the present invention.

Figure 1:
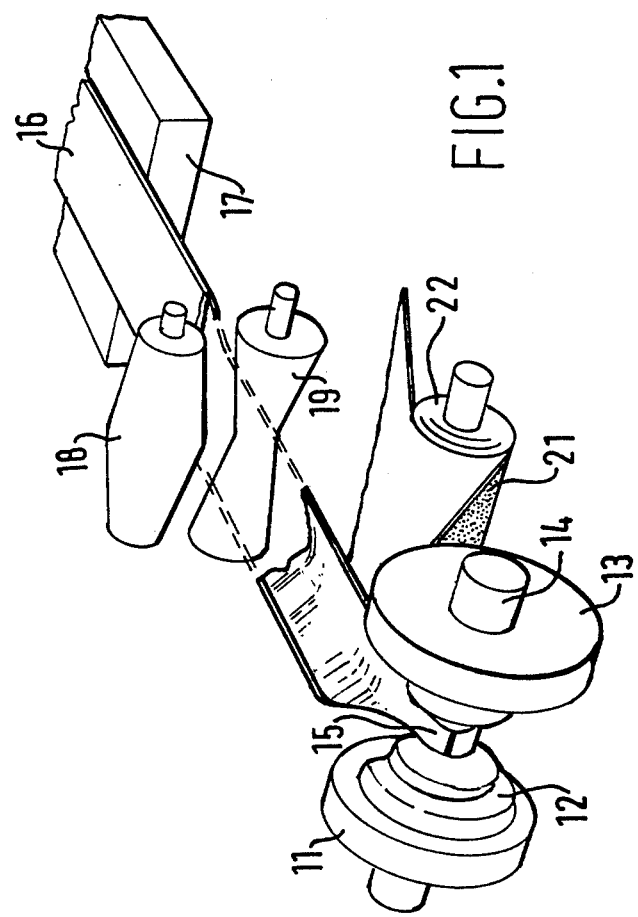
FIGS. 1 and 2 are respectively a perspective view and a side view of one embodiment of apparatus for carrying out the method of the invention.
Figure 2:
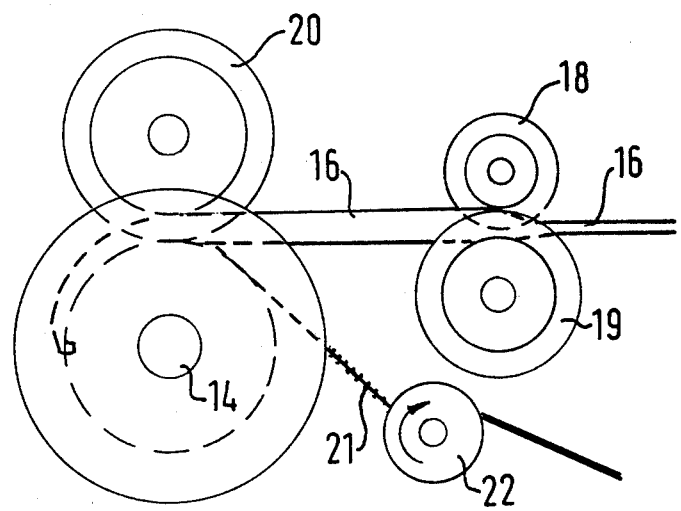
Figure 3:
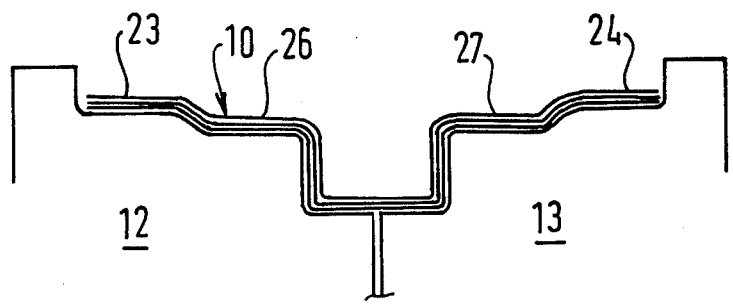
FIG. 3 is a sectional view of a rim wound onto a two-part former.

FIGS. 1 and 2 illustrate apparatus whereby the wheel rim 10 of FIG. 3 may be manufactured. The apparatus comprises a rotatable former 11 which comprises two similar parts 12 and 13 which are jointly rotatable on a coaxial shaft 14 and are axially displaceable thereon so as to be separable for removal from within the finished rim 10. The two parts of the former 11 have a joint periphery which is similar in configuration to the rim 10 to be produced.

In the embodiment illustrated the former 11 is provided with a slot into which the bent-down, leading end of a tapered tongue 15 of a continuous strip of sheet metal may be introduced to provide an initial attachment between the strip and former. This radially inwardly projecting tongue can subsequently be removed from the interior of the finished rim 10. It will be appreciated that any other suitable method could be adopted for temporarily securing the leading end of the tongue 15 to the former 11. For example the former could be provided with studs or pegs, (not shown), engaging in holes therefor in the tongue 15.

The tongue 15 is formed at the leading end of a continuous strip of flat sheet metal, suitably aluminium or steel of a thickness in the range 0.2 to 0.5 mm which is wound off a supply roll (not shown). En route to the former 11 the strip 16 passes over a table 17 and then between oppositely tapered rollers 18 and 19 which impart to the strip 16 a channel shape such that it has a shallow V section prior to reaching the periphery of the former 11. As it arrives tangentially at the periphery of the former 11 the strip 16 passes between the former 11 and a roller 20 (omitted from FIG. 1 for ease of illustration) which has a periphery complementary to that of the former 11 so that the strip 16 is subject to two forces tending to deform it to the shape of the former periphery, namely the longitudinal tension produced in the strip 16 by the tractive force of the former 11 as the latter is rotated and pressure exerted by the roller 20 onto the strip 16 against the former.

When the former 11 has completed one revolution a strip 21 of adhesive is introduced into the nip between the former 11 and roller 20 and fed to the former 11 jointly with the strip 16 so as to be interposed between subsequent turns of the metal strip 16. The adhesive may be any suitable epoxy, polymer or phenolic resin adhesive and such are commercially available in ribbon form usually backed by paper or the like strip, or the adhesive may be a liquid which can be applied to the strip prior to winding and allowed to gel or can be sprayed on during winding. A roller 22 is illustrated over which the ribbon or adhesive can be introduced to the former 11 and other rollers (not shown) may be provided around which the paper backing of the strip may be removed prior to insertion of the adhesive between the turns of the metal strip 16. An adhesive may be chosen of the kind which saturates or coats a strand of filamentary material or a textile strip which therefore becomes incorporated in the finished rim, imparting to it particular characteristics of strength and resilience. Alternatively, or in addition, there may be incorporated one or more turns of a high strength, composite material such as carbon fiber ribbon or cloth, impregnated with suitable polymerizing adhesive in its unpolymerized state.

In the manufacture of certain types of wheel, e.g. aircraft wheels, it may be desirable to provide a substantial quantity of high strength composite material between the metal windings.

When the desired number of turns of the strip 16 has been wound onto the former 11 the wound-on strip may be severed from the supply using a tool or tools acting downwardly on the table 17. Preferably the strip 16 is transversely scored and/or perforated in such a way that the trailing end of the severed strip is feathered or tapered so that there is no sharp projection on the radially outer surface of the finished rim. Excess adhesive may be used to smooth any such projection or if necessary the finished rim may be subjected to a grinding or buffing operation to smooth off the trailing end of the strip. The severing action can be performed by continuing to turn the mandrel while applying further tension to the feed strip by means of a suitable adjustable friction clamp, thus ensuring a tightening of the final winding.

Alternatively or in addition the trailing end of the strip may be fixed to the subjacent turn by lazer spot welds.

The finished rim 10 as shown in FIG. 3 comprises bead retention flanges 23 and 24 at its axial ends, a central tire mounting well 25 and bead seats 26 and 27 between the bead retention flanges and the well. This configuration is such that the diameter of the rim 10 reduces in a series of steps from its axial ends towards its center and this makes it possible to remove the former 11 from the finished rim simply by separating the two parts 12 and 13 of the former along the axis of the shaft 14. If an adhesive is used which must be allowed to set, or heat cured, subsequent to the winding and severing operations the wound rim may be secured against unwinding while it is removed from the mandrel and, e.g. placed in a curing oven by temporarily placing round the rim a high strength textile strap tensioned with a tensioning tool.

Figure 4:
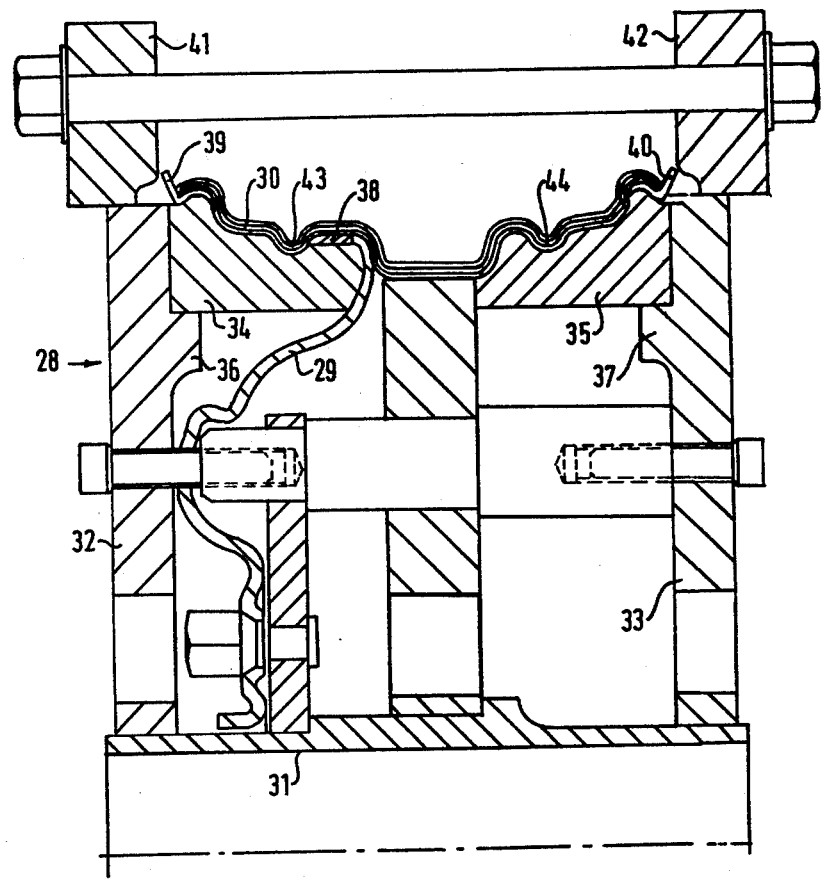
FIG. 4 is a view similar to FIG. 3 illustrating the manufacture of a wheel by means of a modification of the apparatus illustrated in FIGS. 1 and 2.

FIG. 4 illustrates a former 28 of a basically similar but more complex construction for the production of a vehicle wheel which comprises a disc portion 29 and a rim 30. The former 28, rotatable about the axis of a mounting tube 31, comprises circular plates 32 and 33 which support segmented annular blocks 34 and 35 on annular shoulders 36 and 37. An axially extending flange 38 at the radially outer periphery of the disc 29 overlies the block 34 in such a way that it forms an annular projection over which the windings of the rim 30 are bent down. The effect of this arrangement is that the flange 38 is entrapped within the windings so that the disc 29 is incapable of axial displacement relative to the rim 30. Relative rotation between the disc 29 and rim 30 can be prevented by the application of adhesive to the radially outer surface of the flange 38 (e.g. a ribbon thinner than that interposed between the rim windings may be interposed between the flange 38 and the first turn of the rim) and/or by roughening the said surface or providing projections thereon over which the windings of the rim 30 will bend down.

Prior to the winding operation L-section sheet metal rings 39 and 40 are located on the block 34 and 35 so that the edges of the windings will overlie them. Subsequent to the winding operation suitably shaped annular punches 41 and 42 are moved axially inwardly to bend down the upstanding flanges of the rings 39 and 40 over the edges of the finished rim. This results in enclosure of the axial end edges of the wound rim in channels provided by the rings 39 and 40 serving a number of purposes. The appearance of the finished rim is improved and the otherwise exposed edges of the windings are protected against the ingress of foreign matter and against delamination. Also the clenching-on of the rings 39 and 40 will serve to prevent any tendency of the rim to unwind before the adhesive interposed between the turns is set or cured so that the previously described temporary strapping may not be necessary.

It will be seen that unlike the rim 10 of FIG. 3 the rim 30 of FIG. 4 does not reduce in diameter progressively from its axial ends to its center but that its axial ends are bent down and it is provided with grooves 43 and 44 between the bead seats and the well. The purpose of these grooves 43 and 44 is to engage the toe of the bead of the pneumatic tire on the adjacent bead seat in the event of deflation of the tire, thus preventing the entry of the bead into the well and inadvertent dismounting of the tire. The wheel provided is thus a "safety wheel" of a kind known per se and the rim 30 is built on a former, consisting of the plates 32 and 33 and the blocks 34 and 35, which is collapsible in the sense that after separation of the plates 32 and 33 along the axis of the tube 31 to free the blocks 34 and 35 from the shoulders 36 and 37 the sectors making up the blocks 34 and 35 can be displaced inwardly toward the tube 31 sufficiently to permit their removal from within the finished rim.

FIG. 6 illustrates an alternative method whereby the edges of the rim may be protected, having the additional advantage of producing a rim of superior appearance. In the embodiment of FIG. 6 the winding 45 first applied to the former (not shown) is of greater width than the windings 46 subsequently applied, so that edges 47 and 48 of the first winding extend beyond the superimposed windings 46. Preferably the first turn 45 is of a metal more resistant to corrosion and of superior appearance to the subsequent windings 46; for example the first winding 45 may be of chrome iron. As in the embodiment of FIG. 4 a wheel disc 49 is located between the two parts of the former so that a flange 50 of the disc is entrapped within the finished rim. Subsequent to the winding operation the edges 47 and 48 of the first turn 45 are bent over the superimposed windings 46. When a pneumatic tire is mounted on the finished rim the windings 46 will be concealed within it.

Whether the method of FIG. 4 or that of FIG. 6 is used to protect the edges of the rim the channels which enclose the edges may be crimped on in an operation illustrated in FIG. 5. Here a roller 51 rotating about an axis oblique with respect to the axis of the former presses down the radially outer wall of the channel provided by a ring 39 in such a way that the walls of the channel converge towards its open end. This has the effect of crimping the windings inwardly of the axial end edge of the rim 30 so that they splay apart within the channel and lock the channel 39 firmly onto the rim edge. It will be appreciated that the adhesive present between the windings is sufficient to prevent the formation of any free spaces inside the channel.

FIGS. 7 to 11 illustrate the versatility of the method of the invention for producing wheels of a variety of kinds.

FIG. 7 is a section through a portion of a wheel made by the method of the invention of the kind adapted for inter-changeable disc portions. Wheels with interchangeable disc portions are used primarily for tractors and the like heavy duty vehicles rather than for motor cars and instead of a full disc the wheel is made with a T-section ring 52 onto which a chosen disc can be fixed, e.g. by bolting. In the construction of FIG. 7 the T-ring 52 is located between the two parts of the former (not shown) so that the cross-piece of the T-ring projects radially from the former and the windings 53 of the rim are bent down on both sides of the cross-piece of the T-ring 52 so that it is entrapped within the finished rim.

Figure 8:
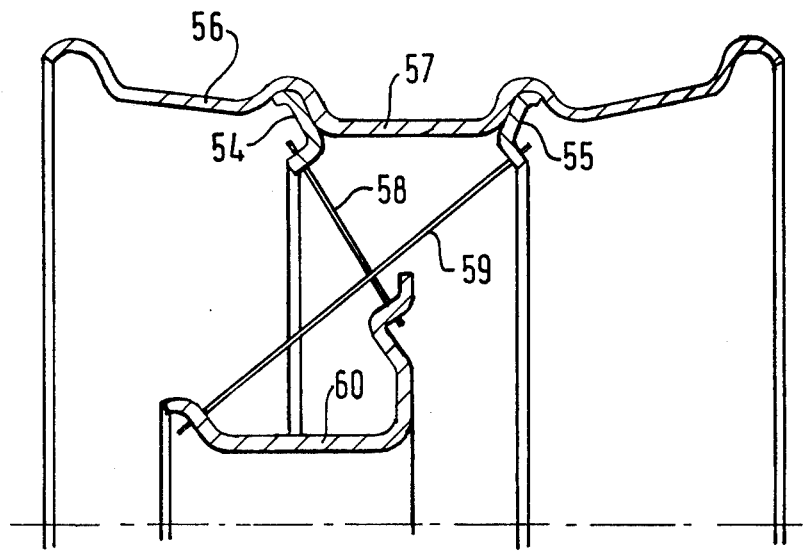

FIG. 8 illustrates the application of the method of the invention to the manufacture of a spoked wheel. Here rings 54 and 55 have been located between axially separable parts of the former (not shown) so as to be entrapped within the finished rim 56. To support the radially inwardly depressed well 57 of the rim between the rings 54 and 55 the former may have a collapsible central portion (not shown) or a central part of the former between the rings 54 and 55 may be omitted and the metal of the windings merely deformed inwardly between the rings 54 and 55 by a roller corresponding to the roller 20 of FIG. 2.

The flanges of the rings 54 and 55 projecting radially inwardly of the finished rim 56 are provided with circumferentially spaced holes for the nipples of spokes 58, 59 extending between the rim 56 and a hub 60 of the wheel.

Figure 9:
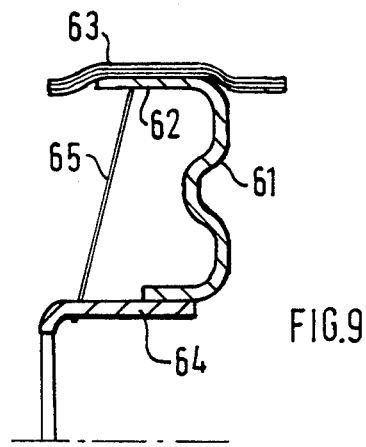

FIG. 9 illustrates a wheel which has a disc 61 analogous to the discs 49 or 29 of FIGS. 6 and 4 having a flange 62 entrapped within the wound rim 63 and extending between the rim 63 and a hub 64. Spokes 65 extend between the flange 62 and the hub 64 on the outboard side of the disc 61 and serve not a structural but purely an aesthetic purpose.

Figure 10:
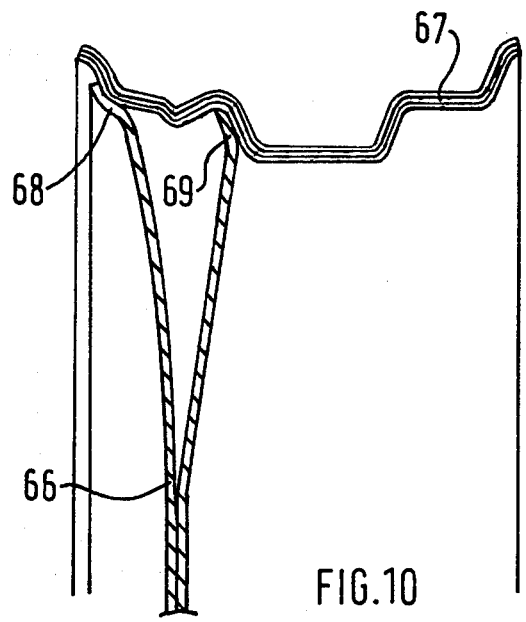
Figure 11:
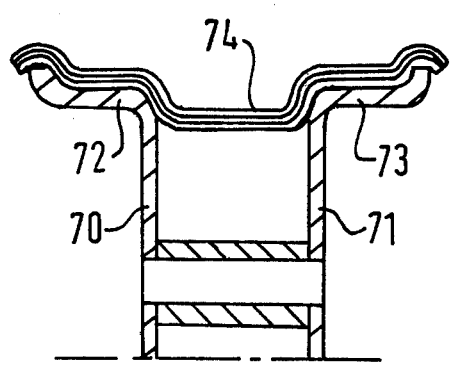

FIGS. 10 and 11 illustrate wheels with reinforced disc portions. In FIG. 10 a double disc 66 comprises two plates which separate towards the rim 67 and the rim 67 is wound onto axially spaced-apart flanges 68 and 69 at the periphery of the disc 66. The former used (not shown) does not occupy the space between the flanges 68 and 69 but the windings of the rim 67 are deformed inwardly of this space by a roller analogous to the roller 20 of FIG. 2 to lock the rim 67 to the disc 66.

FIG. 11 illustrates a wheel having two discs 70 and 71 axially spaced apart and having at their peripheries divergent axial flanges 72 and 73 onto which the rim 74 is wound.

It will be apparent that the technique of deforming the metal strip as it is wound over opposite axial edges of a component of the finished product so as to entrap the same has applications wider than the manufacture of vehicle wheels. This technique of entrapment of a radially inwardly extending component of an annular product is applicable, for example, to the manufacture of barrels or like containers where the wound peripheral wall of the barrel or container is deformed over a disc which will provide an end of the barrel.

Where the technique of FIGS. 4, 5, and 6 is to be adopted of protecting the axial end edges of the wound product by rings or the like which are present on the former during the winding operation and are bent over the edges of the windings prior to removal of the former it is preferable that when the strip is severed, e.g. on the table 17 of FIG. 1, side portions of the strip are removed at its trailing end so that they will not foul the rings, or edges of the first winding, when these are bent over. This may be done by a stamping operation which preferably simultaneously forms a tongue 15 at the leading end of the strip remaining on the supply roll to initiate winding of the next article.

I claim:

1. A method of manufacturing a wheel rim for a pneumatic tire, said rim having bead retention flanges upstanding from its axially outer sides, the method comprising:
    winding a strip of thin ductile sheet metal spirally onto a former having a profiled peripheral configuration corresponding to the interior configuration of the rim with portions on its axial width of different diameters;
    deforming the strip as it is wound into a configuration having said bead retention flanges by maintaining it under longitudinal tension while winding;
    interposing an adhesive between superimposed turns of the strip.

2. The method of claim 1 in which the former has a central portion of decreased diameter for a wheel rim well including deforming the sheet metal strip into said portion of decreased diameter to produce a tire mounting well in the central portion of the formed rim.

3. The method of claim 2 including deforming the metal strip into a shallow V shape prior to winding it onto the former.

4. The method of claim 1 including applying pressure against the sheet metal as it is wound onto the former by a roller having a configuration complementary to that of the former.

5. The apparatus of claim 1 in which the former has a reduced diameter in its central portion for forming a tire mounting well in the rim.

6. A method as claimed in claim 1, wherein the metal strip used is an aluminium alloy of a thickness in the range 0.2 mm to 0.5 mm.

7. A method as claimed in claim 1 wherein the metal strip used is steel of a thickness in the range 0.2 mm to 0.5 mm.

8. A method as claimed in claim 1 wherein the adhesive used is an epoxy resin.

9. A method as claimed in claim 1 wherein the adhesive used is a polymeric adhesive.

10. A method as claimed in claim 1 wherein the adhesive used is a phenolic resin.

11. A method as claimed in claim 1 wherein a textile strip impregnated with the adhesive is inserted between the turns.

12. A method as claimed in claim 1 wherein the former comprises at least two parts which are mutually separable to withdraw them axially from the wound rim.

13. A method as claimed in claim 1 wherein the radially innermost turn of the wound rim extends axially beyond the layers superimposed thereon and wherein subsequent to the winding operation the edges of said innermost turn are bent over the edges of the superimposed layers to enclose the same.

14. A method as claimed in claim 1 wherein prior to the winding operation rings each substantially of L-section are advanced into contact with the respective ends of the former and then subsequent to the winding operation deforming the rings substantially to C-shape to enclose the edges of the wound strip.

15. A method as claimed in claim 1 wherein prior to the winding operation rings each substantially of L-section are advanced into contact with the respective ends of the former and then subsequent to the winding operation deforming the rings substantially to C-shape to enclose the end edges of the wound strip and wherein subsequent to enclosing the respective end edge of the wound rim the channel defined by the deformed ring is deformed to diminish in width toward its open end so that the windings entrapped therein splay within the channel to lock the channel on the windings.

16. A method as claimed in claim 1 wherein a predetermined length of the strip is severed from a supply thereof by transversely scoring the strip and subsequently subjecting the strip to a longitudinal tension sufficient to break off said length to have a tapered trailing end edge.

17. A method as claimed in claim 1 wherein edge portions of the strip are removed to provide a leading end of the strip supply which has a tapered tongue.

18. A method of manufacturing a vehicle wheel having a profiled wheel rim and a disc portion which extends radially inwardly of the rim, the method comprising locating the disc portion relative to a former having a periphery corresponding to the intended internal shape of the rim so that said disc portion provides a radial projection from said former periphery, winding onto the former periphery superimposed turns of a continuous strip of sheet metal with an adhesive interposed between the turns under forces which deform the strip to the shape of the former periphery and bend down the strip over opposite axial ends of said projection, and removing the former from within the wound rim so that the disc portion is entrapped within an annular groove in the rim against relative axial displacement.

19. A method as claimed in claim 18 wherein the disc portion is located between two axially separable parts of the former so that an axially extending flange on the periphery of said disc portion overlies the periphery of one of said former parts to define said projection.

20. Apparatus for manufacturing a vehicle wheel rim by spirally winding a continuous strip of ductile sheet metal with an adhesive interposed between the turns, the apparatus comprising a rotatable former having a periphery with a profile similar to the internal shape of a rim to be manufactured and including portions on its axial width of different diameters to produce tire bead retention flanges upstanding from the axially outer sides of generally cylindrical bead seat regions, means to supply a continuous strip of sheet metal generally tangenially to said periphery, means to secure a leading end of the strip relative to the former periphery, means to rotate the former so that the strip is wound onto the former under a longitudinal tension load so that the successive turns of the strip are deformed to adopt the shape of the former periphery and means to introduce an adhesive between successive turns of the strip as the latter are wound.

21. Apparatus as claimed in claim 20 and comprising a roller having a periphery shaped to be complementary to the periphery of the former and arranged to press the strip windings against the former.

22. Apparatus as claimed in claim 20 wherein the former comprises at least two parts which are mutually separable along the axis of rotation of the former for withdrawal from a wound rim.

23. Apparatus as claimed in claim 20 wherein co-operating non-cylindrical rollers of opposite taper are arranged in the path of the strip to the former to impart to the strip prior to application to the former a channel shape such that the walls of the channel upstand relative to the former.

24. The apparatus of claim 20 in which the means to introduce an adhesive between successive turns is at least one roller located adjacent the former.

25. The apparatus of claim 20 in which the means to introduce an adhesive between successive turns is at least one roller over which a ribbon of adhesive is passed.

* * * * *